United States Patent [19]
Wada et al.

[11] Patent Number: 5,138,217
[45] Date of Patent: Aug. 11, 1992

[54] DRIVING POWER UNIT FOR PIEZOACTUATOR SYSTEM AND METHOD

[75] Inventors: Tatuya Wada; Hiroshi Hikita; Nobutaka Machida; Mituharu Nonami, all of Saitama; Yukinori Kawamura, Yokosuka; Tomohiro Takigawa; Saburou Gotou, both of Tokyo, all of Japan

[73] Assignee: Fuji Electric Co., Ltd., Japan

[21] Appl. No.: 693,078

[22] Filed: Apr. 29, 1991

Related U.S. Application Data

[63] Continuation of Ser. No. 523,115, May 14, 1990, abandoned.

[30] Foreign Application Priority Data

May 12, 1989 [JP] Japan .................................. 1-117492

[51] Int. Cl.$^5$ ............................................. H01L 41/08
[52] U.S. Cl. .................................... 310/316; 310/317; 310/318; 310/319
[58] Field of Search ................................ 310/316-319

[56] References Cited

U.S. PATENT DOCUMENTS

| 3,742,492 | 6/1973 | Proctor | 310/316 |
| 4,507,762 | 3/1985 | Meyer et al. | 310/317 |
| 4,714,935 | 12/1987 | Yamamoto et al. | 310/317 |
| 4,866,326 | 9/1989 | Niikawa et al. | 310/316 |
| 4,947,074 | 8/1990 | Suzuki | 310/316 |

FOREIGN PATENT DOCUMENTS 2178619 2/1987 United Kingdom .

Primary Examiner—Mark O. Budd
Assistant Examiner—Thomas M. Dougherty
Attorney, Agent, or Firm—Brumbaugh, Graves, Donohue & Raymond

[57] ABSTRACT

A driving power unit for a piezoactivator is disclosed that utilizes a semiconductor switching device for supplying power to the piezoelement. When the voltage measured across the piezoelement attains a predetermined valve, the semiconductor switching device turns off. Sensing devices cause the switching device to turn on upon the voltage dropping by a predetermined margin and cause the voltage source to turn off when the switching device remains on beyond a predetermined time period. Memory and logic circuitry also control the switching sequence of the switching device.

12 Claims, 8 Drawing Sheets

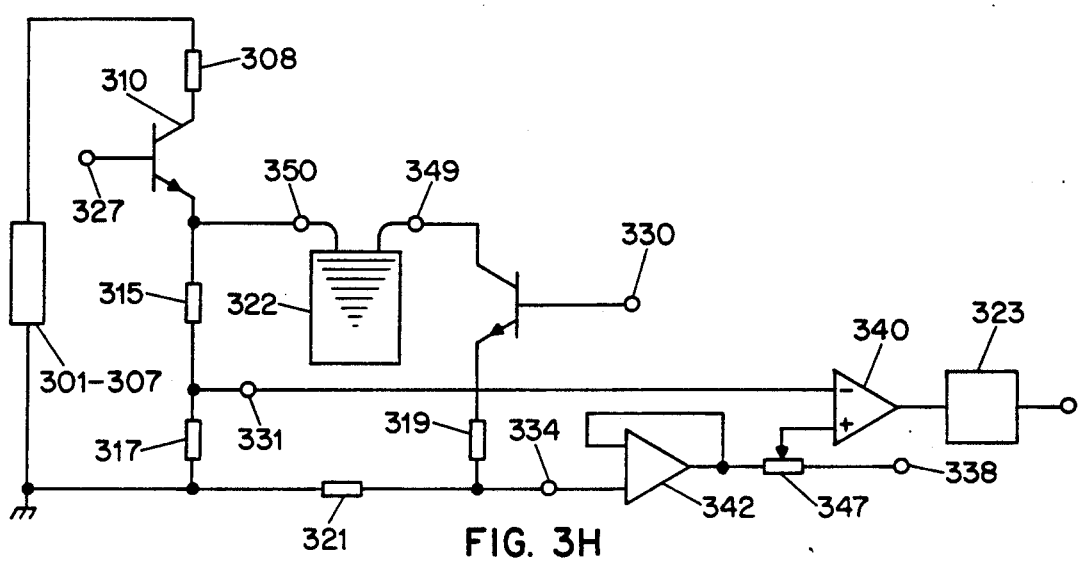
FIG. 3H
| | INPUT | | | OUTPUT | | | |
|---|---|---|---|---|---|---|---|
| OPERATION MODE | L | K | J | (310) Tr1 | (311) Tr2 | (312) Tr3 | (313) Tr4 |
| PLUS HI | H | H | H | H-L | L | L | H |
| PLUS LOW | L | H | H | H-L | L | L | H |
| MINUS | N/A | H | L | L | H-L | H | L |
| OV | N/A | L | N/A | L | L | H | H |
H-L SWITCHING
FIG. 3J
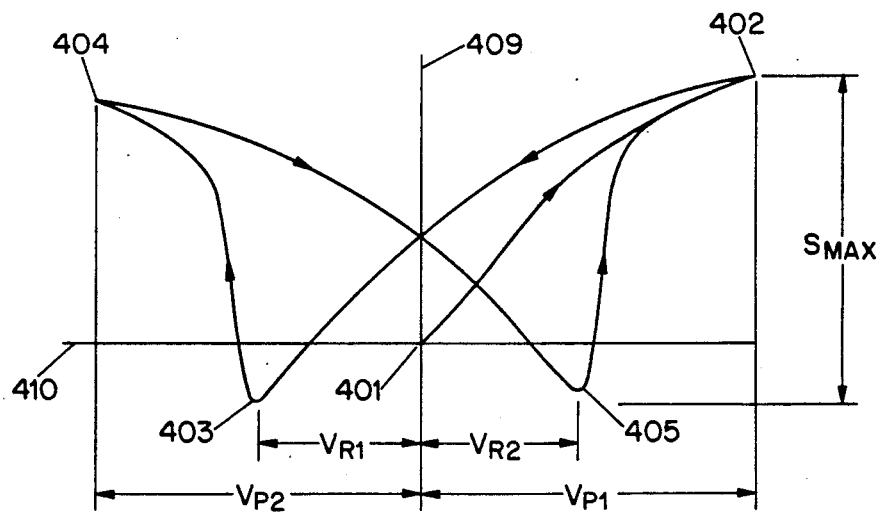
FIG. 4

DRIVING POWER UNIT FOR PIEZOACTUATOR SYSTEM AND METHOD

This application is a continuation of application Ser. No. 07/523,115, filed on May 14, 1990, abandoned.

BACKGROUND OF THE INVENTION

The present invention relates to a driving power unit for a piezoactuator in which, for example, a lamination-type piezoelement is used as a driving element.

Conventionally, a DC voltage source supplies a voltage equal to that applied to a piezoactuator. With this system, the applied voltage is turned on and off by means of a contact switch circuit or a non-contact switch circuit, and is discharged via a discharge circuit. In addition, when two or more voltage levels are needed, each voltage must be supplied by a separate power source or the voltage is divided in a resistance-type voltage dividing circuit and the divided voltages are switched using a switching circuit.

FIG. 2 shows a conventional example with an AC power source 201, a slideac 202, a step-up transformer 203, a bridge with 204 diodes, a smoothing capacitor 208, a discharging switch 209, charging switches 210 and 211, a limiting resistance 212, a lamination-type piezoactuator (PZT) 213 and a power supply line 214 from another power source.

Since the piezoactuator 213 is also a capacitor in a conventional power source as described above, it is necessary to insert the limiting resistance 212 to limit current surges in the voltage application circuit. For this reason, when the piezoactuator 213 approaches the power source voltage, the current flowing into the piezoactuator is reduced because of the limiting resistance thereby decreasing the boosting speed of the piezoactuator. This delays the voltage buildup. In addition, a switching element that can withstand large current surges is needed to improve the buildup by decreasing the limiting resistance. This has also proved useless, however, because almost no current actually flows after the power source voltage is reached because the piezoelement also acts as a capacitor.

A discharging circuit is also required in addition to the voltage application circuit. A high voltage is needed for a high power piezoelement as used in a piezopress (a press in which a piezoelement is used) necessitating use of an expensive contact relay. In this case, if the limiting resistance is reduced, it may not be possible to interrupt the circuit if the piezoelement short-circuits between lamination electrodes.

A purpose of the present invention is to provide a driving power unit for a piezoactuator which solves the problems described above.

SUMMARY OF THE INVENTION

To achieve the foregoing and other objectives, the driving power unit for the piezoactuator in the present invention has a DC voltage source with a voltage higher than that applied to the piezoelement, a semiconductor to apply the voltage from the DC voltage source to the piezoelement in a manner capable of switching, and a control means for detecting the voltage between electrodes of the piezoelement when the voltage is applied from the DC voltage source to the piezoelement. The control means turns the semiconductor element off when the voltage reaches a predetermined value.

In the present invention, the voltage from a DC power source (which is higher than the voltage applied to a piezoactuator) is applied to a piezoelement by means of, for example, a transistor. The voltage between the electrodes of the piezoelement is detected and the transistor is turned off when a predetermined voltage is reached. This drives the piezoactuator.

In accordance with the invention, a piezoactuator system includes a first piezoelement, a DC power source for supplying a DC voltage higher than a desired piezoelement charging voltage and semiconductor means for switchably coupling the DC voltage to the piezoelement. The system also includes control means, coupled to the piezoelement and the semiconductor means, for monitoring the charging voltage across the piezoelement and for causing the semiconductor means to decouple the DC voltage from the piezoelement when the charging voltage across the piezoelement equals or has a predetermined relationship to the desired piezoelement charging voltage, whereby the piezoactuator system operates with increased efficiency as a result of the piezoelement being energized with a DC voltage which, when applied, always significantly exceeds the voltage across the piezoelement.

Also in accordance with the invention, a method for energizing a piezoelement in a piezoactuator system includes the steps of: supplying a DC voltage higher than a desired piezoelement charging voltage; initially coupling the DC voltage to the piezoelement; monitoring the voltage across the piezoelement; decoupling the DC voltage from the piezoelement when the voltage monitored reaches the desired charging voltage; enabling the voltage across the piezoelement to drop to substantially zero voltage; and re-initiating the first step.

For a better understanding of the invention, together with other and further objects, reference is made to the following description, taken in conjunction with the accompanying drawings, and its scope will be pointed out in the appended claims.

BRIEF DESCRIPTION OF THE DRAWINGS

The above and further advantages of the invention will be better understood with respect to the following detailed description of a preferred embodiment, taken in combination with the several figures of the associated drawings in which:

FIG. 4 shows a voltage-displacement curve of a piezoelement when an AC voltage is applied;

DESCRIPTION OF THE PREFERRED EMBODIMENTS

Figure 1:
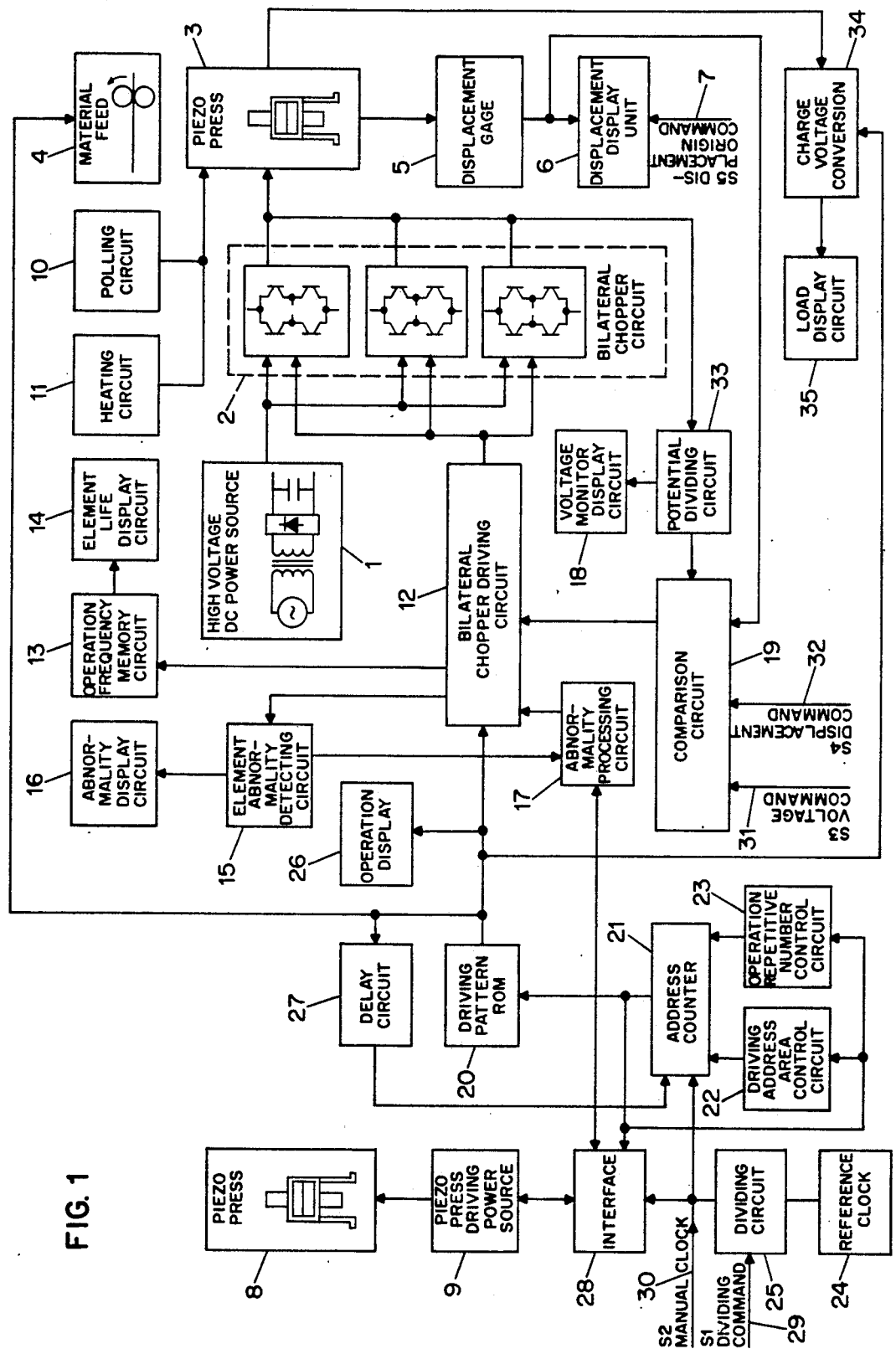
FIG. 1 is a circuit block diagram showing an embodiment of the present invention.
Figure 2:
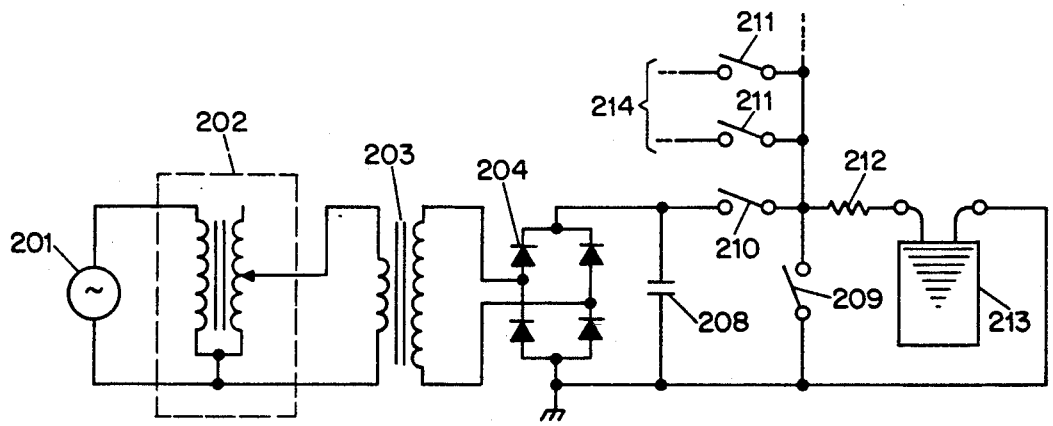
FIG. 2 is a circuit diagram of conventional equipment.

A preferred embodiment of the present invention will now be described in detail, with reference to the drawings. FIG. 1 shows an embodiment of the present invention. In FIG. 1, a DC voltage is supplied to a bilateral chopper circuit 2 from a high-voltage DC power source 1. The bilateral circuit has three elements and is connected to three piezoactuators which drive an upper punch, a lower punch and a movable stripper of a piezopress 3. The actuators of the piezopress can also be connected to a polling circuit 10 and a heating circuit 11 by means of circuit changeover. Thus, repolarization can be done without disassembling the unit even if the polarization state of the lamination-type piezoelements in the piezoactuators has deteriorated.

Figure 5:
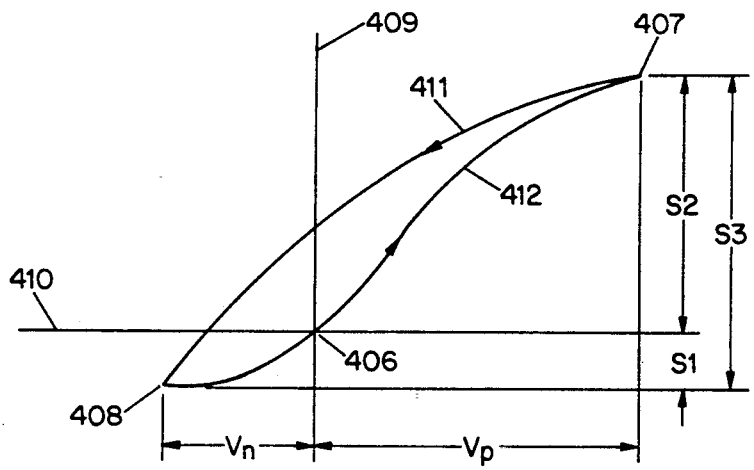
FIG. 5 shows a voltage-displacement curve employed in the piezoactuator.

FIG. 4 shows a voltage-displacement curve when an AC voltage is applied to the piezoelement. FIG. 5 shows a voltage-displacement curve for the piezoactuator. 401 represents the initial state, 402 represents the state immediately before a positive-side dielectric breakdown, 403 is a negative-side polarization inverting position, 404 is the state immediately before a negative-side dielectric breakdown, 405 is a positive-side polarization inverting position, 406 represents the displacement origin, 407 is the maximum elongation point, 408 is the maximum contraction point, 409 is the displacement axis, while 410 is the voltage axis, 411 shows a voltage-displacement curve at the time of a voltage drop, 412 is a voltage-displacement curve at the time of boosting, $V_{R1}$ represents a negative-side polarization inverting voltage, $V_{R2}$ is a positive-side polarization inverting voltage, $V_{P1}$, $V_{P2}$ represent dielectric breakdown voltages, $S_{max}$ is the maximum displacement, $V_n$ is a negative voltage, $V_P$ represents a positive voltage, S1 represents a contraction displacement, S2 represents an elongation displacement and S3 represents the maximum usable displacement.

The charging voltage of the piezoactuator is lowered in a voltage dividing circuit 33 and is displayed on a voltage monitor display circuit 18 as a voltage output at a measurement terminal. The bilateral chopper circuit 2 is driven by a bilateral chopper driving circuit 12. A driving-pattern ROM 20 is connected to the bilateral chopper driving circuit 12, and the data from this is converted into signals which drive the bilateral chopper circuit 2. The driving signals are converted into an operational display by an operation display circuit 26.

Figure 3B:
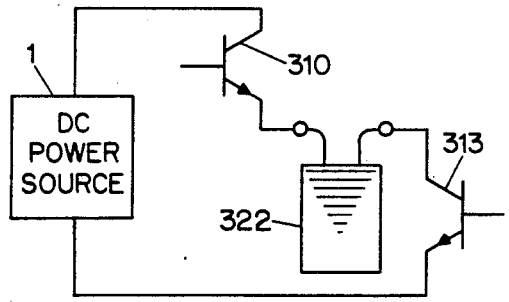
FIGS. 3B–3D are voltage application route diagrams of the modes of a piezoelement.
Figure 3C:
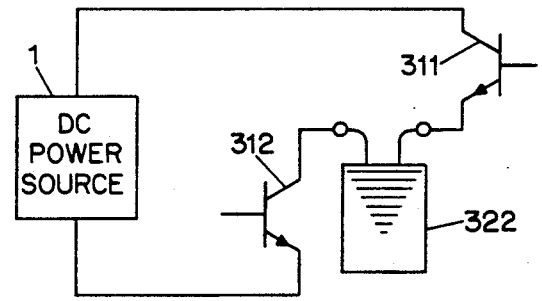
Figure 3D:
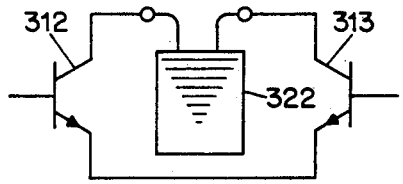
Figure 3F:
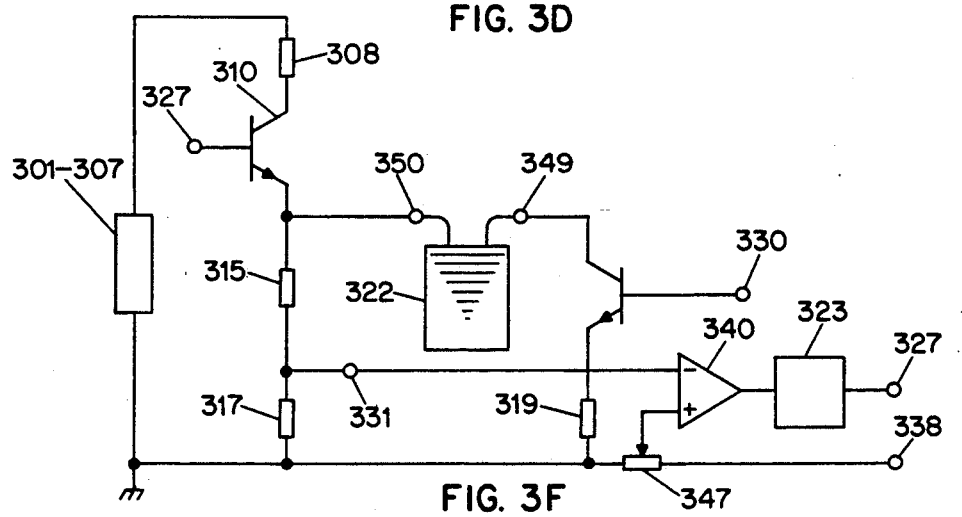
FIGS. 3F and 3H show embodiments of a comparison circuit.
Figure 3A:
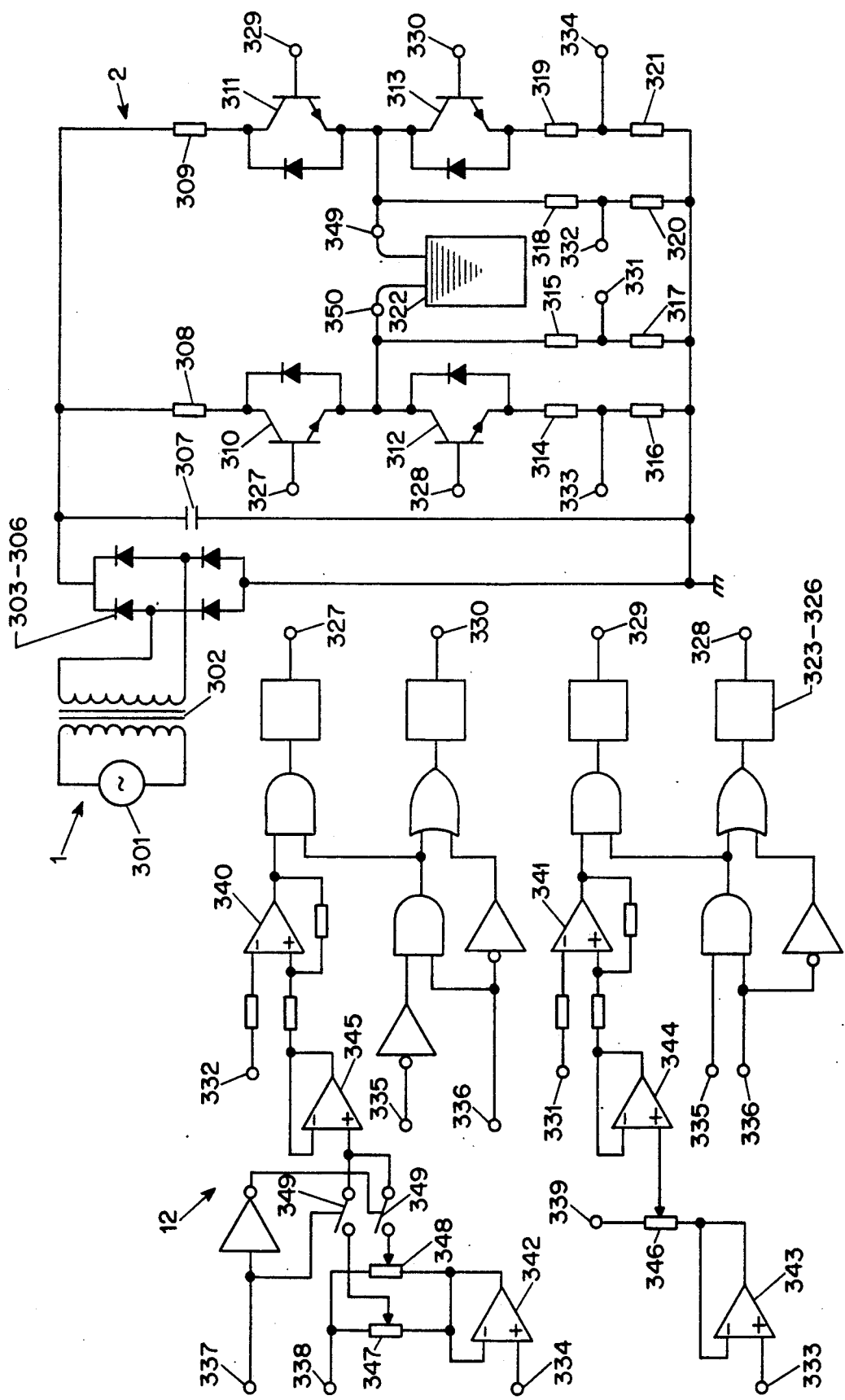
FIG. 3A is a circuit diagram showing a principal section of FIG. 1.

FIG. 3A shows an embodiment of a high-voltage DC power source 1, the bilateral chopper circuit 2 and the bilateral chopper driving circuit 12 shown in FIG. 1. The elements include an AC power source 301, a step-up transformer 302, rectifier diodes 303-306, a smoothing capacitor 307, limiting resistances 308 and 309, switching transistors (with diodes) 310-313, voltage dividing resistances 314-321, PZT 322, transistor-base driving circuits 323-326, circuit-connecting terminals 327-334, operation-mode command signal input terminals 335-337, reference voltage input terminals 338 and 339, comparators 340 and 341, operational amplifiers 342-345, a negative-mode voltage-setting volume 346, positive-mode voltage-setting volumes 347 and 348, and junctions 349 and 350.

FIG. 3B shows a positive-mode voltage application route with respect to the piezoelement. FIG. 3C shows a negative-mode voltage application route for the piezoelement, and FIG. 3D shows a voltage discharging route in a 0 V mode. FIG. 3J shows a truth table of the circuit operation in FIG. 3A.

Now, the bilateral chopper circuit will be described in detail, with reference to FIG. 3. One element portion consists of a circuit with two sets of transistor modules (transistors 310, 311, 312, 313), each set including two NPN transistors connected in series with terminals 349 and 350 connected to the midpoint of the series. A piezoelement 322 is connected to these terminals 349 and 350. The collector sides of transistors 310 and 311 are connected to the positive side of the high-voltage DC power source 1; the emitter sides of transistors 312 and 313 are connected to the negative side of the DC source. As shown in FIGS. 3B and C, when one set of transistors on the positive side of the D.C. source among two sets of transistor modules is turned on, the transistors on the negative side of the DC source in another set of modules go ON. This makes it possible to apply reciprocal voltages to the piezoelement 322. If it is assumed that the application of a voltage to invert the polarization state of the piezoelement 322 is in a negative application mode (FIG. 3C), and the inverse is in a positive application mode (FIG. 3B), positive and negative application modes both become possible.

In applying a voltage to the piezoelement 322 that is lower than the voltage of the DC source 1, the potential difference between the positive potential terminal 350 of the piezoelement and the negative potential of the DC source is obtained through a voltage division (voltage dividing circuit 33) and is compared with a preset voltage (comparison circuit 19). When they become equal, the transistor connected to the positive side of the DC source 1 is turned off so as to stop charging the piezoelement 322 to attain a target voltage. When electric charges of the piezoelement 322 are discharged after this through a voltage detection circuit, and when the voltage is lowered by some margin, the transistor goes on. Repeating this process makes it possible to maintain the charging voltage (bilateral chopper driving circuit).

In addition, there is a 0 V (zero volt) mode. When both sets of transistors 312 and 313 connected to the negative side of the DC source 1 for two sets of transistor modules (so that the potential difference across both ends of the piezoelement 322 becomes zero, as shown in FIG. 3D) are turned on, this discharges the electric charges of the piezoelement 322, and interlocking is achieved in the driving logical circuit. This means that the transistor connected to the positive side of the DC source does not go on.

The driving data for the circuit such as the one described above are stored in the ROM 20, and the piezopress 3 is driven by the address command. It is also possible to write material feed timing signals in the ROM 20 and to send these signals to a material feed device 4. This enables synchronous operation of the press motion and the material feed motion. In addition, if the piezoelement 322 electrically shortcircuits between lamination electrodes, the transistor 310 or 311 on the positive side of the DC source 1 will stay on. Here, this ON time is detected, and the power source 1 goes off when the ON time exceeds a preset time.

The piezoactuator's charging voltage is controlled to keep the target charging voltage. This is done by assembling a voltage command 31 and a displacement command 32 with a actually measured voltage or the output of a displacement gage 5, which is fed back through the voltage dividing circuit 33 in the comparison circuit 19. The application state is also fed back to the bilateral chopper driving circuit 12. The displacement gage 5 measures the motion of the piezopress 3, and the results are displayed on a displacement display unit 6. The origin of the display is reset by a displacement origin command 7.

The piezoactuator 322 has a limited service life. One of the reasons for this is that short-circuits occur between the electrodes due to dielectric breakdowns between lamination electrodes. When this occurs, the transistor 310 or 311 of the chopper circuit 2 connected to the positive side of the DC source 1 stays on during the voltage application command. If the transistor of the chopper circuit 12 stays on longer than the preset time, an element short-circuit detecting circuit 15 sends a signal to a malfunction display circuit 16 to indicate an abnormal short-circuit. This signal also goes to a malfunction-processing circuit 17. The malfunction-processing circuit 17 sends an interrupt signal to the bilateral chopper driving circuit 12, which goes into 0 V mode. This process can keep the circuit components from burning out.

The service life of the piezoactuator 322 is recorded in an operation-frequency memory circuit 13 and is compared with the frequency of actual use. An element life display circuit 14 shows when the operational life is over. The signal from a piezoelectric-type load sensor (not shown) in the piezoactuator 322 is input to a charge-voltage conversion circuit 34, and the output is displayed on a load display circuit 35 as the operational load of the piezoactuator 322. In addition, to prevent the output of the piezoelectric-type load sensor from drifting, a no-load state of the piezoactuator 322 is determined based on the data output from the driving-pattern ROM 20, and the input terminal of the charge-voltage conversion circuit 34 is short-circuited to be reset under a no-load state.

Figure 3E:
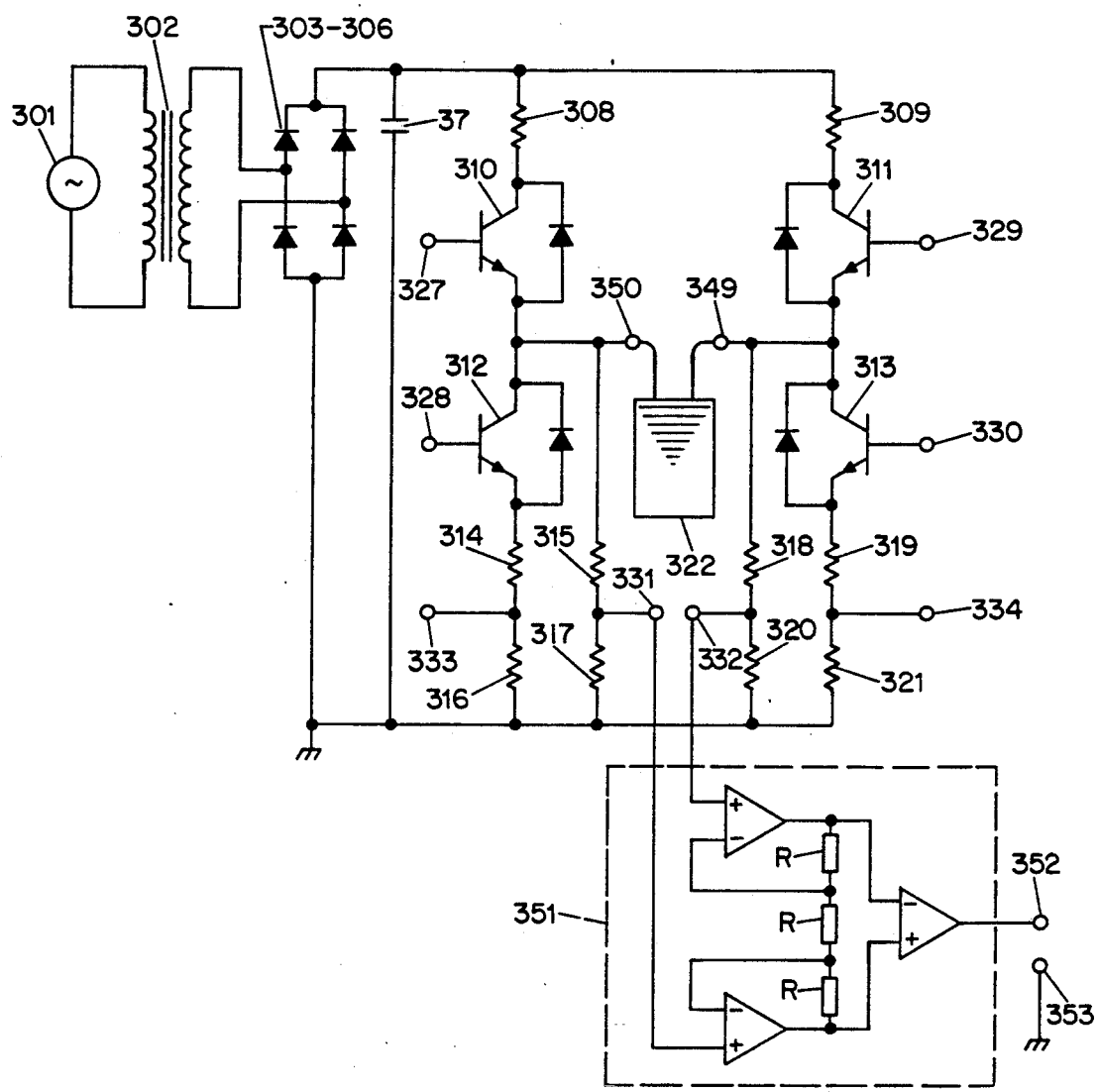
FIG. 3E shows an embodiment of a voltage monitor circuit.
Figure 3G:
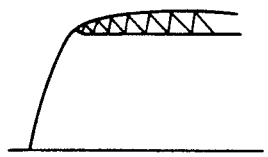
FIGS. 3G(a,b) and 3I(a–d) show the relationship between the element voltage and the displacement.
Figure 3I:
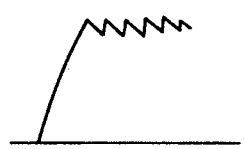
FIG. 3J shows an operational truth table of the circuit in FIG. 3A.
Figure 3I:
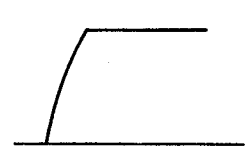
Figure 3G:
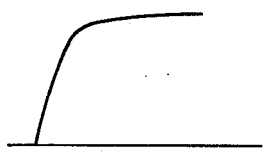
Figure 3I:
Figure 3I:
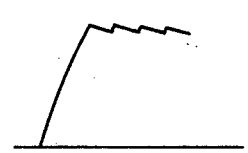
Figure 6A:
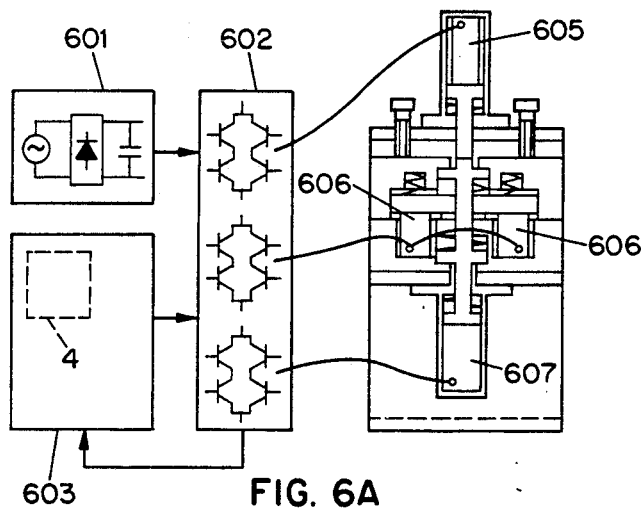
FIGS. 6A and 6B are schematic connection diagrams of a piezopress driving power source and a piezopress device.
Figure 6B:
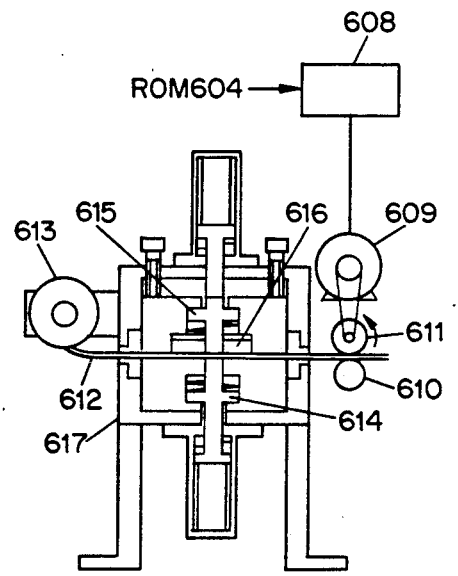

In the driving-pattern ROM 20, the read addresses are designated by an address counter 21. The address counter counts up a reference clock 24, which is divided by a frequency divider circuit 25 or a manual clock 30. The address counter 21 is arranged to repeatedly designate a specific area of the driving-pattern ROM 20 by means of a driving address area control circuit 22. The address counter 21 is controlled so that it can be stopped at a preset operation frequency. This setting is done by an operation repetitive frequency control circuit 23. This instrument makes it possible to accurately set the required volume. A delay circuit 27 receives the driving signals from the material feeding device 4 which are then sent out of the driving-pattern ROM 20. The delay circuit 27 also outputs a signal to stop the count of the address counter 21 for a preset period of time. An interface 28 moves a control signal to and from a piezopress power source 9 which drives another piezopress 8. FIG. 3E shows an embodiment of a voltage monitor circuit having a differential circuit 351, and an external output terminal 352 and 353. The display is connected to these terminals. FIGS. 3F and 3H show embodiments of a comparison circuit 19 which compares the voltage of the element with the reference voltage; it also turns the transistor on and off. The element voltage and the displacement at that time are shown in FIG. 3G and FIGS. 3I (a) and (b). FIGS. 3I (c) and (d) show an embodiment when the control voltage is widened and the mechanical friction resistance is reduced. FIGS. 6A and 6B show schematic diagrams of connection between the piezopress driving power source and the piezopress device.

These diagrams show a DC power source 601, a bilateral chopper circuit 602, a control circuit 603, a driving pattern ROM 604, lamination-type piezoactuators 605-607, a motor driver 608, a motor 609, feed rollers 610 and 611, a material 612 to be worked on, a pulley 613, a lower punch 614, an upper punch 615, a movable stripper 616, and a press frame 617.

Figure 6C:
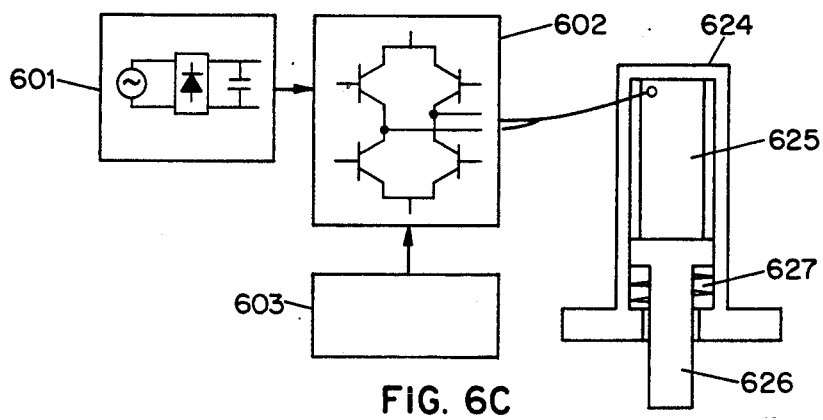
FIG. 6C is a schematic diagram of the connection between a piezoactuator and a driving power source.

FIG. 6C shows a schematic diagram of the connection between the piezoactuator and the driving power source with DC power source 601, a bilateral chopper circuit 602, a control circuit 603, a case 624, lamination-type piezo-actuator 625, a movable piece 626, and a return spring 627.

Figure 7:
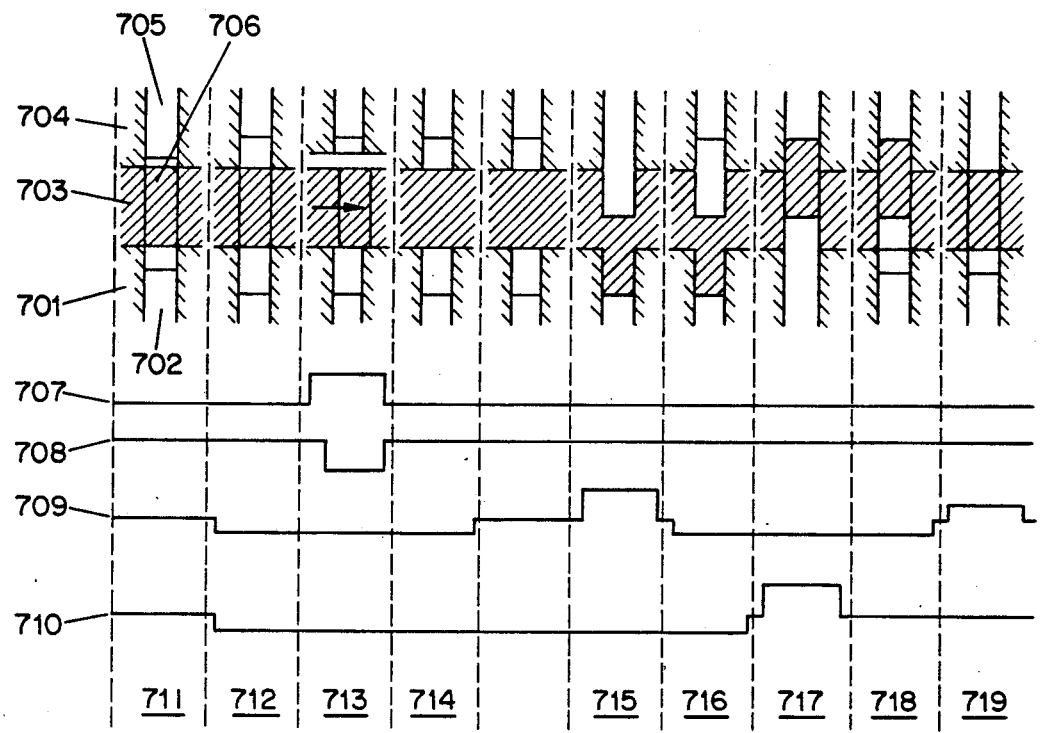
FIG. 7 shows a working process and a control voltage waveform using a piezopress.

FIG. 7 shows a working process and a control voltage waveform in which a piezopress is employed. Here, 701 is a lower die. 702 a lower punch, 703 is a blank, 704 is a movable stripper, 705 an upper punch, 706 a blank, 707 is a movable stripper driving voltage, 708 an external control output, 709 an upper-punch driving voltage, 710 is a lower punch driving voltage, 711 is a pre-trimming process end stage, 712 a punch recess process, 713 a material feed process, 714 a material fixing process, 715 an upper-punch half-blanking process, 716 an upper punch recess, 717 is a reverse trimming process, 718 a lower punch recess, and 719 denotes a push-back process.

Figure 8:
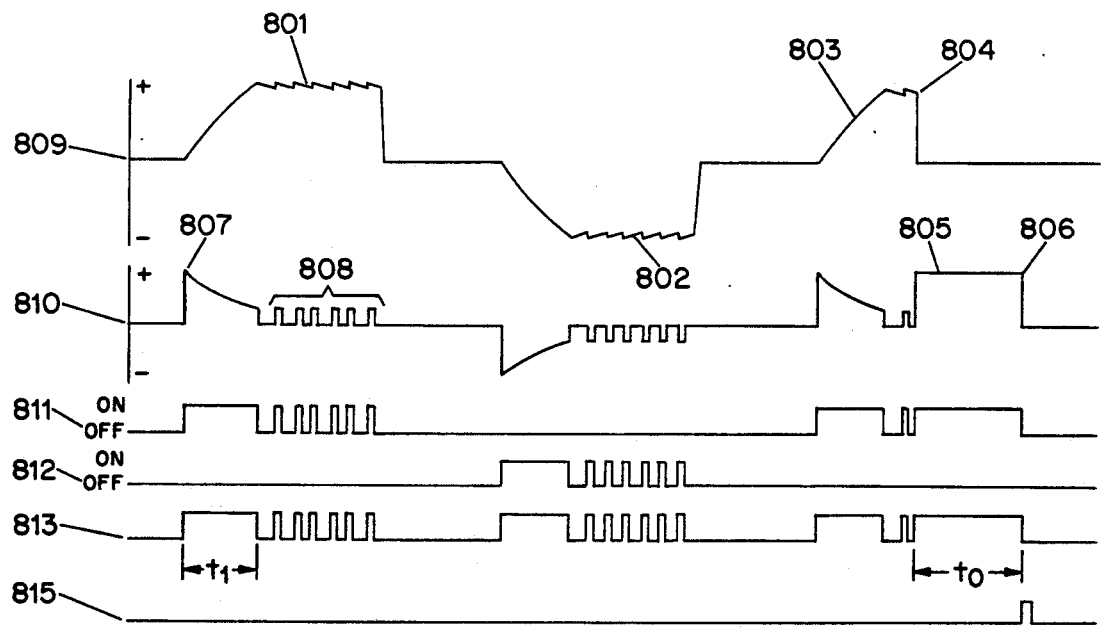
FIG. 8 is an overview of the piezoactuator shortcircuit detection and circuit protective operation.

FIG. 8 explains piezoactuator short-circuit detection and the circuit protective operation. Here, 801 denotes a positive mode, 802 a negative mode, 803 a positive mode, 804 is the time the short-circuit occurs between lamination electrodes, 805 is a short-circuit current, 806 the circuit-stopping time, 807 is a current surge, 808 an element voltage-maintaining current, 809 a piezoactuator voltage, 810 denotes a circuit current, 8911 and 812 are control signals, 813 is a composite signal, 804 a 0 V mode, t1 denotes the longest conducting time in normal operation, t2 is a short-circuit-detecting time, and 816 denotes a circuit-stopping signal.

Figure 9:
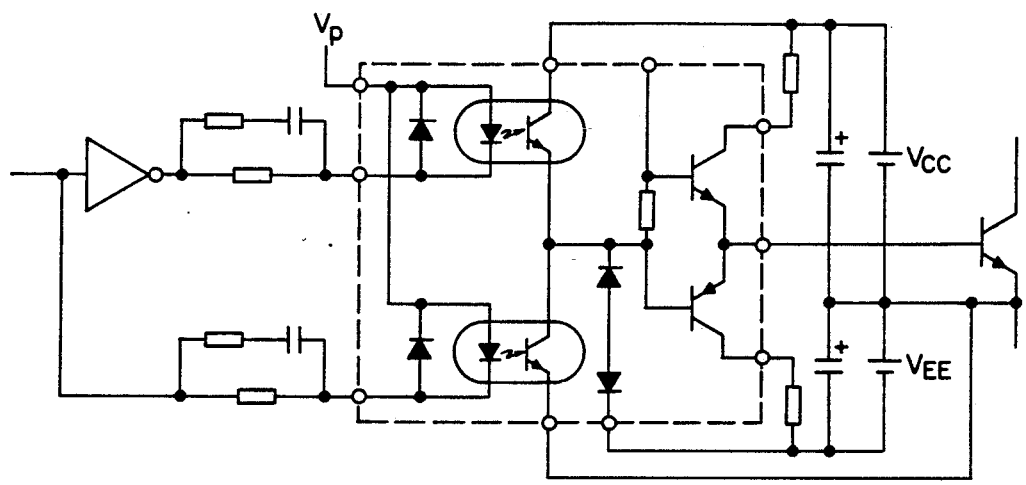
FIG. 9 shows an embodiment of a transistor base drive circuit.

FIG. 9 shows an embodiment of transistor base drive circuits 323 to 326.

Figure 10A:
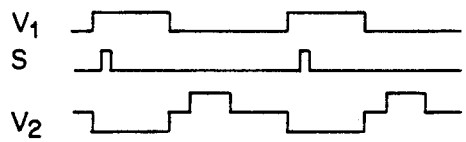
FIGS. 10A, 10D and 10E show an embodiment of a driving pattern at the time of single trimming.
Figure 10B:
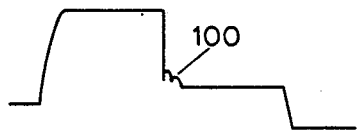
FIGS. 10B and 10C show the displacement of a punch movable piece and a driving voltage at that time.
Figure 10C:
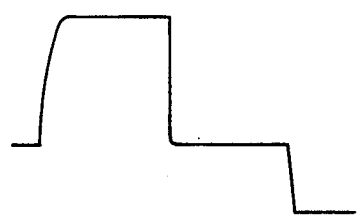
Figure 10D:
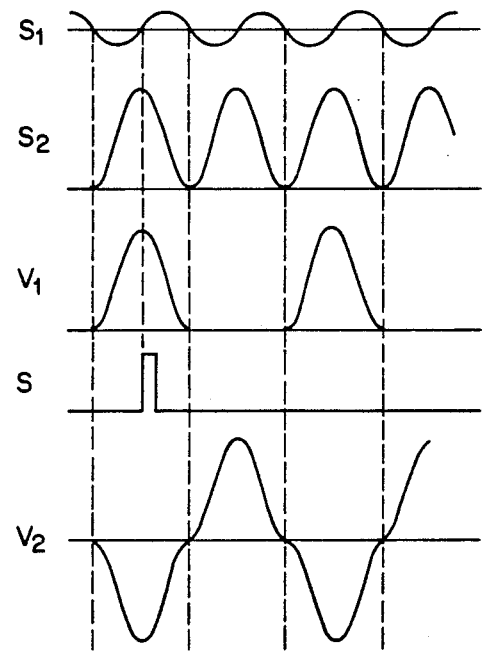
Figure 10E:
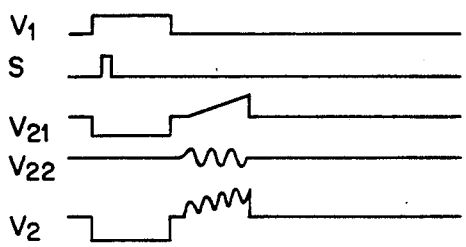

FIGS. 10A, 10D and 10E show an embodiment of a driving pattern in single trimming. FIGS. 10B and 10C show the displacement of the punch movable piece and a driving voltage at that time. $V_1$ denotes a movable stopper driving voltage, $V_2$ a punch driving voltage, S an external control output, $V_{21}$ and $V_{22}$ are actuator driving voltages, $S_1$ is a 90° phase signal of the reference voltage, $S_2$ is sinusoidal wave reference voltage, and 100 denotes an actuator movable-piece collision-vibration-displacement portion.

The description above on the embodiment of the present invention can be summarized as follows:

1. A signal is output to drive a material feed device attached to a press.

2. A circuit detects short-circuits between lamination electrodes in a piezoelement and stops application of voltage to the piezoactuator.

3. The voltage applied to the piezoactuator is displayed, and a low voltage monitor is produced.

4. A circuit receives the operational quantity of the piezoactuator from the outside as a voltage signal, and varies the voltage applied to the actuator to obtain the present operational quantity.

5. The accumulated number of times the piezoactuator operates is displayed and stored. When the operation is performed over the preset number of times, this is displayed.

6. A circuit waits for a preset time without shifting to the next operation after sending a seizing signal to the material feed device. This means the time may be varied from outside.

7. The press driving program is held as ROM data. Address switching enables using several types of operation patterns.

8. The ROM read address data to another piezopress, internal operation clock and an abnormal operation signal may be input/output to and from the outside through the interface circuit.

9. The mode of applying voltage to the piezoactuator is displayed.

10. The PZT charging speed is increased using a bilateral chopper circuit.

11. When the charging voltage is lowered after the preset voltage is reached, the transistor is turned ON with a voltage with a certain hysteresis width. This maintains the voltage.

12. The control voltage width is narrowed to such an extent that even if it has the voltage pulsation, the mechanical system of the cylinder can absorb the pulsation.

13. The control voltage is widened to generate vibrations in the order of one. This reduces the frictional resistance of the mechanical system and improves the accuracy of the cylinder motion stroke.

14. The 0 V mode facilitates obtaining the displacement origin of the actuator.

15. The number of times of operation is set in advance, so the operation stops when that number is reached.

16. The negative voltage may be applied, increasing the maximum stroke in the piezoelement.

17. Two or more levels of positive voltages may be applied to perform push-back.

18. A circuit which polarization processes the element is provided to prevent the piezoelement from deteriorating. A circuit which can apply an AC voltage with no polarization inversion is attached at this time to shorten the polarization time. A self-heating circuit using AC voltage is provided.

19. A circuit converts the signal of the piezoelectric load sensor of the piezoactuator into a load signal and displays it, and a circuit resets the sensor to synchronize with the press operation.

As described above, the present invention enables driving the piezoactuator with rapid buildup. Accordingly, the present invention is best suited for a press machine provided with, for example, an upper punch, a movable stripper and a lower punch.

Although the invention has been illustrated and described herein by reference to a specific embodiment thereof, it will be understood by those skilled in the art that such embodiment is susceptible to modification and variation without departing from the inventive concepts disclosed. All such modification and variations, therefore, are intended to be encompassed within the spirit and scope of the appended claims.

We claim:

1. A piezoactuator system, including a piezoactuator and a driving power circuit, comprising:

(a) a first piezoactuator for displacing a workpiece from a reference position to an extended position and returning said workpiece to said reference position, including:

a piezoelement;

a workpiece positioned to be displaced by said piezoelement;

enclosure means, for supporting said piezoelement and said workpiece, including an end member for restraining one end of said piezoelement when the opposite end displaces said workpiece; and resilient means, resiliently coupling said workpiece and said piezoelement to said end member, for permitting said piezoelement to expand to displace said workpiece from said reference position and for returning said workpiece to said reference position on contraction of said piezoelement; and (b) a driving power circuit for repetitively activating said piezoactuator to displace said workpiece to a predetermined extended position, including;

a DC power source for supply a DC voltage significantly higher than a predetermined level of piezoelement voltage across said piezoelement;

semiconductor means for switchably and reversibly coupling said DC voltage to said piezoelement;

control means, coupled to said piezoelement and said semiconductor means, for controlling activation of said piezoelement to displace said workpiece to said predetermined extended position by monitoring the piezoelement voltage and causing said semiconductor means to decouple said DC voltage from said piezoelement when said piezoelement voltage reaches a predetermined level significantly lower than said DC voltage, and for controlling deactivation of said piezoelement by causing said semiconductor means to couple said DC voltage to said piezoelement with reversed polarity and decouple said reversed polarity DC voltage when the piezoelement voltage reaches a predetermined reverse level, for providing controlled contraction of said piezoelement to permit positioning of said workpiece to said reference position substantially independently of hysteresis error;

whereby, the piezoactuator system is enabled to repetitively drive said workpiece with improved power transfer and accurately repeatable workpiece positioning.

2. A piezoactuator system according to claim 1, wherein said control circuit means additionally comprises chopper circuit means operative during each activation of said piezoelement for causing said DC voltage to be coupled to and decoupled from said piezoelement a plurality of times during each workpiece drive stroke for repeatedly returning said piezoelement voltage to said predetermined level during each drive stroke to provide increased workpiece drive effectiveness.

3. A piezoactuator system according to claim 2, wherein said chopper circuit causes said DC voltage to be coupled and decoupled in accordance with a substantially rectangular waveform for a period of time during each drive stroke of said workpiece.

4. A piezoactuator system according to claim 1, additionally including a second piezoactuator, comprised as said first piezoactuator and controlled by said driving power circuit as said first piezoactuator, and wherein said first piezoactuator is arranged to drive an upper punch and said second piezoactuator is arranged to control a movable stripper of a press machine.

5. A piezoactuator system according to claim 4, additionally including a third piezoactuator, comprised as said first piezoactuator and controlled by said driving power circuit as said first piezoactuator, and wherein said third piezoactuator is arranged to drive a lower punch in coordination with the driving of an upper punch by said first piezoactuator.

6. A piezoactuator system, including a piezoactuator and a driving power circuit, comprising:
   (a) a first piezoactuator for displacing a workpiece from a reference position to an extended position and returning said workpiece to said reference position, including:
   a piezoelement;
   a workpiece positioned to be displaced by said piezoelement;
   enclosure means, for supporting said piezoelement and said workpiece, including an end member for restraining one end of said piezoelement when the opposite end displaces said workpiece; and
   resilient means, resiliently coupling said workpiece and said piezoelement to said end member, for permitting said piezoelement to said end member, for permitting said piezoelement to expand to displace said workpiece from said reference position and for returning said workpiece to said reference position on contraction of said piezoelement; and
   (b) a driving power circuit for repetitively activating said piezoactuator to displace said workpiece to a predetermined extended position, including:
   a DC power source for supplying a DC voltage significantly higher than a predetermined level of piezoelement voltage across said piezoelement;
   semiconductor means for switchably and reversibly coupled said DC voltage to said piezoelement;
   control means, coupled to said piezoelement and said semiconductor means, for controlling activation of said piezoelement to displace said workpiece to said predetermined extended position by monitoring the piezoelement voltage and causing said semiconductor means to decouple said DC voltage from said piezoelement when said piezoelement voltage reaches a predetermined level significantly lower than said DC voltage, and additionally comprising chopper circuit means operative during each activation of said piezoelement for causing said DC voltage to be coupled to and decoupled from said piezoelement a plurality of times during each workpiece drive stroke for repeatedly returning said piezoelement voltage to said predetermined level during each drive stroke to provide increased workpiece drive effectiveness;
   whereby, the piezoactuator system is enabled to repetitively drive said workpiece with improved power transfer and accurately repeatable workpiece positioning.

7. A piezoactuator system according to claim 6, wherein said chopper circuit causes said DC voltage to be coupled and decoupled in accordance with a substantially rectangular waveform for a period of time during each drive stroke of said workpiece.

8. A method for energizing a piezoelement in a piezoactuator system to repetitively drive a workpiece from a reference position to a predetermined extended position with repeatable accuracy and improved power transfer, comprising the steps of:
   (a) providing a piezoelement coupled to a movable workpiece;
   (b) holding said workpiece in a reference position;
   (c) supplying DC voltage higher than a predetermined piezoelement voltage representative of said predetermined extended position;
   (d) initially coupling said DC voltage to said piezoelement with a first polarity to initiate a drive stroke to drive said work piece to said predetermined extended position;
   (e) monitoring the piezoelement voltage across said piezoelement;
   (f) decoupling said DC voltage from said piezoelement when said monitored voltage reaches said desired piezoelement voltage in order to terminate said work piece drive stroke and enable said work piece to return to said reference position;
   (g) holding said workpiece in said reference position; and
   (h) repeating steps (c) through (g) to repetitively drive said work piece from said reference position to said predetermined extended position.

9. A method according to claim 8, additionally comprising the following steps between said steps (e) and (f);
   (w) decoupling said DC voltage from said piezoelement when said monitored voltage reaches said desired piezoelement voltage; and
   (x) repeating steps (e) and (w) in order to maintain said piezoelement voltage within a predetermined range during the duration of said work piece drive stroke;
   wherein the effectiveness of said work piece drive stroke is improved.

10. A method according to claim 9, wherein step (x) additionally includes the step of utilizing a substantially rectangular waveform in coupling and decoupling said DC voltage in repeating steps (e) and (w).

11. A method according to claim 8, additionally comprising the following steps between said steps (f) and (g);
   (y) coupling said DC voltage to said piezoelement with a polarity reversed from said first polarity; and
   (z) decoupling said reversed polarity DC voltage from said piezoelement when said monitored voltage reaches a predetermined reverse voltage level so as to more accurately return said work piece to said reference position independently of hysteresis error.

12. A method according to claim 9, additionally comprising the following steps between said steps (f) and (g):
   (y) coupling said DC voltage to said piezoelement with a polarity reversed from said first polarity; and
   (z) decoupling said reversed polarity DC voltage from said piezoelement when said monitored voltage reaches a predetermined reverse voltage level so as to more accurately return said work piece to said reference position independently of hysteresis error.

* * * * *

UNITED STATES PATENT AND TRADEMARK OFFICE
CERTIFICATE OF CORRECTION

PATENT NO. : 5,138,217
DATED : August 11, 1992
INVENTOR(S) : Wada et al.

It is certified that error appears in the above-identified patent and that said Letters Patent is hereby corrected as shown below:

<u>Title page, 5th line of ABSTRACT</u>, "valve" should read --value--;

<u>Column 6, line 51</u>, "804" should read --814--;

<u>Column 8, line 30</u>, "supply" should read --supplying--;

<u>Column 9, lines 32-33</u>, delete "to said end member, for permitting said piezoelement".

Signed and Sealed this

Sixteenth Day of March, 1993

*Attest:*

STEPHEN G. KUNIN

*Attesting Officer*  Acting Commissioner of Patents and Trademarks